United States Patent [19]
Wilson

[11] 3,887,219
[45] June 3, 1975

[54] DETACHABLE COUPLER ADAPTER FOR ROLLING BASE DOLLIES

[75] Inventor: James D. Wilson, Newport Beach, Calif.

[73] Assignee: Banner Metals Division Intercole Automation, Inc., Compton, Calif.

[22] Filed: May 20, 1974

[21] Appl. No.: 471,218

[52] U.S. Cl. .............................................. 280/408
[51] Int. Cl. .............................................. B60d 1/14
[58] Field of Search ............ 280/408, 491 R, 491 E, 280/492, 493, 410, 79.1

[56] References Cited
UNITED STATES PATENTS

| | | | |
|---|---|---|---|
| 1,378,445 | 5/1921 | Ferris............................ | 280/79.1 X |
| 1,494,077 | 5/1924 | Reichmann...................... | 280/410 |
| 2,712,452 | 7/1955 | Hallowell..................... | 280/491 R X |

*Primary Examiner*—Leo Friaglia
*Assistant Examiner*—R. Schrecengost
*Attorney, Agent, or Firm*—Jessup & Beecher; Keith D. Beecher

[57] ABSTRACT

A detachable coupler is provided for intercoupling wheeled carriages, such as rolling base dollies to one another so as to permit a train of the dollies to be moved from place-to-place. The adapter includes three loop members, two of which are attached to the forward end of the dolly, and one of which is attached to the rear end of the dolly. The coupler also includes a three-pronged bar, which has hooked ends, and which engages the two forward loops of one dolly and the rear loop of a second dolly, so as to intercouple the dollies.

1 Claim, 1 Drawing Figure

DETACHABLE COUPLER ADAPTER FOR ROLLING BASE DOLLIES

BACKGROUND OF THE INVENTION

Rolling base dollies are presently in widespread use in the storage and transportation of goods. It is usual, however, normally to move each dolly individually by manual means. The adapter of the present invention is advantageous in that it may easily be mounted on existing rolling base dollies to permit the dollies to be intercoupled and decoupled at will, so that they may be moved as a train, for example, by mechanical means.

As mentioned above, the detachable coupler of the invention includes a plurality of loop members which may be easily attached to existing rolling base dollies, so that each dolly is equipped with two loop members at its forward end, and one loop member at its rear end. The coupler also includes, as also mentioned above, a three-pronged adapter bar which may be dropped into the loop members between the individual dollies to permit a simple detachable coupling between the dollies. A multiplicity of such bars may be stored in the work area, to permit any desired number of the dollies to be intercoupled into a train, whenever such intercoupling is desirable.

BRIEF DESCRIPTION OF THE DRAWING

The single FIGURE is a perspective representation of the coupler adapter of the present invention in one of its embodiments.

DETAILED DESCRIPTION OF THE ILLUSTRATED EMBODIMENT

Figure 1:
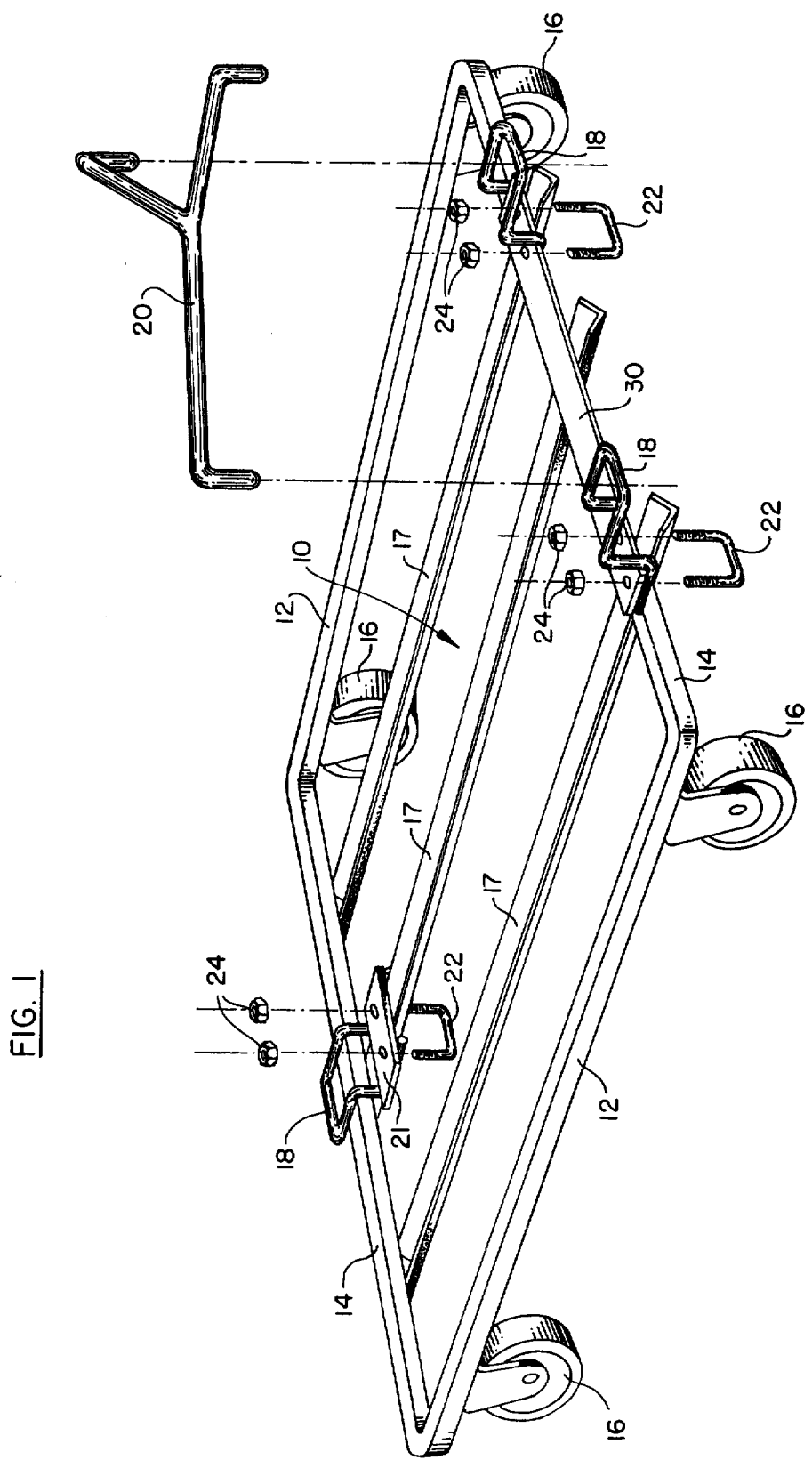

As shown in the drawing, a typical rolling base dolly 10 has side edges 12 and end edges 14. The dolly also has swivel casters 16 mounted at each corner. The coupler adapter of the invention includes three loop members 18, one of which is attached to the rear edge of the dolly and the other two of which are attached in spaced positions to the forward edge. The dolly also includes a plurality of elongated bottom support members 17 secured to the end edges 14, and extending between the end edges in spaced parallel relationship.

The coupler also includes a three-pronged bar 20, which has a hooked configuration at the end of each prong. Two of the prongs of the bar 20 may be dropped into the forward loop members 18 of the illustrated carriage, and the other prong of the bar 20 may be dropped into the rear loop member 18 of a similar dolly to intercouple the two dollies.

As shown, the rear loop member 18 may be mounted on the dolly 10 by means of a strip 21 which is attached to the loop member and which extends across the end of one of the support members 17. A U-shaped bolt 22 extends under the support member 17, and the bolt has threaded end portions which extend up through holes in the strip 21.

A pair of nuts 24 are threaded to the threaded portions of the bolt 22 securely to hold the strip and bolt in a mounted condition on the support member 17. A similar strip 30 extends across and between the two forward loop members 18, and it is held on corresponding support members 17 by similar U-bolts 22 and associated nuts 24.

It is evident, therefore, that the detachable coupler adapter of the invention may be easily and expeditiously mounted on existing rolling base dollies, and serves as a simple, convenient, and inexpensive means for adapting the dollies to be intercoupled with one another, in the described manner.

It will be appreciated that although a particular embodiment of the invention has been shown and described, modifications may be made. It is intended in the claims to cover the modifications which come within the spirit and scope of the invention.

What is claimed is:

1. A detachable coupler adapter for intercoupling wheeled carriages such as rolling base dollies, and the like, each of the carriages having a peripheral rod-like member forming a rectangular base with two end edges and two side edges and a plurality of elongated bottom support members extending in spaced and parallel relationship from one of the end edges to the other across the area circumscribed by said rod-like member, said adapter including a first loop member mounted at one of the end edges of the base, second and third loop members mounted at spaced positions at the other end edge of the base, bracket means for mounting the individual loop members on the base, said bracket means including a first transverse strip attached to said first loop member and a first U-shaped bolt extending around one of said bottom support members and through holes in the first transverse strip to mount the first loop member on the base, and said bracket means including a second transverse strip attached to said second and third loop members, and second and third U-shaped bolts respectively extending around two of said bottom support members and through holes in said second transverse strip to mount the second and third loop members on the base, and a three-pronged bar member having a hooked configuration at the end of each prong, so that two of the prongs of the bar member detachably engage the second and third loop members of one of the wheeled carriages, and so that the third prong of the bar member detachably engages the first loop member of another of the wheeled carriages.

* * * * *